No. 831,806. PATENTED SEPT. 25, 1906.
H. H. SMITH.
NUT LOCK.
APPLICATION FILED MAR. 6, 1906.
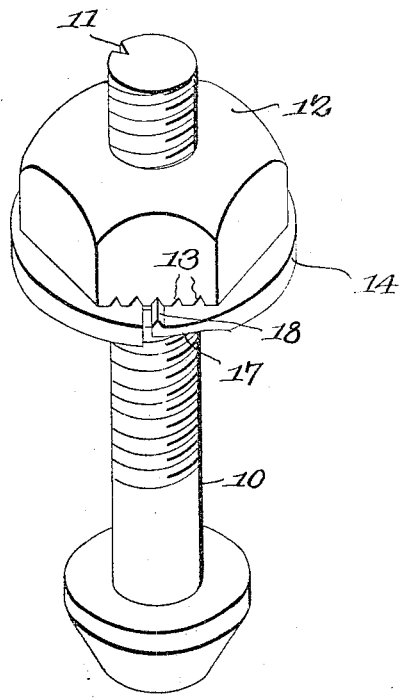
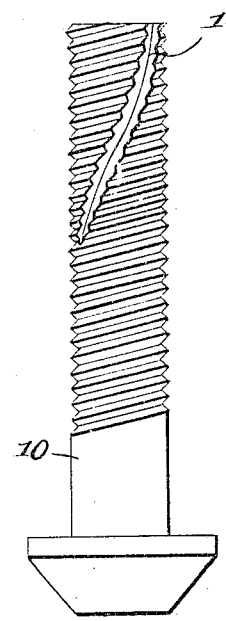
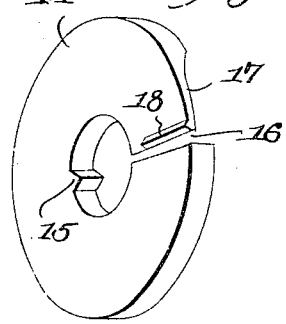
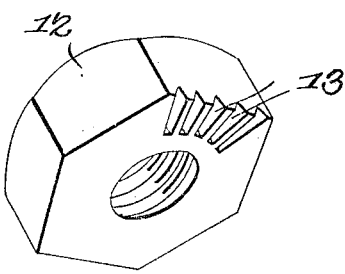
Harvey H. Smith,
INVENTOR.
WITNESSES:
By
ATTORNEYS

UNITED STATES PATENT OFFICE.

HARVEY H. SMITH, OF LANCASTER, OHIO.

NUT-LOCK.

No. 831,806.

Specification of Letters Patent.

Patented Sept. 25, 1906.

Application filed March 6, 1906. Serial No. 304,576.

*To all whom it may concern:*

Be it known that I, HARVEY H. SMITH, a citizen of the United States, residing at Lancaster, in the county of Fairfield and State of Ohio, have invented a new and useful Nut-Lock, of which the following is a specification.

This invention relates to nut-locks, and has for its object to simplify and improve the construction and increase the efficiency of devices of this character.

With this and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1 is a perspective view of a bolt and nut with the improvement applied thereto. Fig. 2 is a side elevation of the bolt portion of the improved device. Fig. 3 is a perspective view of the nut portion of the improved device. Fig. 4 is a perspective view of the washer portion of the improved device.

In the improved device is embraced a bolt 10, having a spiral groove 11 formed in its threaded end, a nut 12, having a plurality of radial channels 13 extending partly through its lower face, a washer 14, having a lug 15 for engaging the groove 11 and with a cleft therethrough at one side at 16, and the body of the washer cut away at 17 adjacent to the cleft to render this portion of the washer resilient, and with a rib 18 at the terminal of the resilient portion. The incline of the spiral groove 11 corresponds to the incline of the threads of the bolt, so that when the washer 14 is positioned upon the bolt with its lug 15 in the groove 11 and the nut 12 positioned upon the bolt and rotated to cause it to bear upon the washer the washer will be "picked up" by the engagement of the rib 18 with one of the depressions 13 and carried around with the nut and at the same time moved longitudinally of the bolt to a corresponding extent. Then when the washer bears upon the structure to be held and is retarded thereby the continued movement of the nut causes the radial depressions 13 to pass over the rib 18, the resilient portion 17 yielding sufficiently to permit this action.

By providing a plurality of the depressions 13 the nut may be turned a considerable distance after the washer is in solid contact with the structure being held, so that the requisite "grip" of the nut may be applied to any desired extent.

Any required number of the depressions 13 may be employed and located at any required place upon the nut.

The depressions 13 are inclined upon both sides, so that the rib and its resilient support 17 will yield to a force sufficient to operate the nut either in applying it to the bolt or in removing it therefrom, while at the same time holding the nut against all tendency to displacement by jars or concussions to which it may be subjected while in use.

The radial grooves extending only partly through the face of the nut do not mutilate or weaken the threads of the nut, but leave a solid unbroken face entirely around the threaded aperture, as in an ordinary nut.

The relatively small portion of the surface of the nut occupied by the radial grooves does not materially reduce the bearing-face. Hence the nut having the grooves is as fully efficient as the ordinary nut.

The grooves 13 being comparatively shallow can be pressed in the face at the same time that the nut is manufactured and will not, therefore, require special implements or extra handling to produce the grooves.

The device is simple in construction, can be inexpensively manufactured, and applied to any size or form of nut and bolt.

Having thus described the invention, what is claimed is—

In a nut-lock the combination of a bolt having a spiral groove in its threaded portion, a nut engaging said bolt and having a plurality of radial grooves extending partly through its bearing-face but not communicating with the threaded aperture thereof, a split washer having an inwardly-projecting lug bearing in said spiral groove and with the portion adjacent to the joint reduced in thickness and provided with a radial rib adapted to engage said radial grooves one at a time.

In testimony that I claim the foregoing as my own I have hereto affixed my signature in the presence of two witnesses.

HARVEY H. SMITH.

Witnesses:
C. C. PICKERING,
F. FULKERSON.